United States Patent [19]
Leyten

[11] Patent Number: 5,991,608
[45] Date of Patent: Nov. 23, 1999

[54] PORTABLE COMMUNICATION DEVICE WITH OPTIMIZED TRANSMISSION LOSS

[75] Inventor: Lukas Leyten, Eindhoven, Netherlands

[73] Assignee: U.S. Phillips Corporation, New York, N.Y.

[21] Appl. No.: 08/815,240

[22] Filed: Mar. 12, 1997

[30] Foreign Application Priority Data

Apr. 16, 1996 [EP] European Pat. Off. .............. 96201023

[51] Int. Cl.⁶ ................................................... H01Q 11/12
[52] U.S. Cl. ........................... 455/121; 455/90; 455/269; 455/575; 343/860; 343/702
[58] Field of Search .............. 455/90, 121, 124, 455/129, 403, 550, 562, 575, 269, 280, 281, 282, 284; 343/701, 860, 861

[56] References Cited

U.S. PATENT DOCUMENTS

| | | | |
|---|---|---|---|
| 5,337,061 | 8/1994 | Pye et al. .................................. | 343/702 |
| 5,493,311 | 2/1996 | Itoh et al. ................................. | 343/860 |
| 5,535,435 | 7/1996 | Balzano et al. .......................... | 455/562 |
| 5,561,437 | 10/1996 | Phillips et al. .......................... | 455/575 |
| 5,659,889 | 8/1997 | Cockson .................................. | 455/280 |

FOREIGN PATENT DOCUMENTS

0341238B1  11/1989  European Pat. Off. ......... H01Q 1/27

*Primary Examiner*—Dwayne D. Bost
*Assistant Examiner*—Nay A. Maung
*Attorney, Agent, or Firm*—Dicran Halajian

[57] ABSTRACT

A portable electronic apparatus is disclosed having an antenna and a communication circuit. The antenna impedance is chosen to be a predetermined value which is deliberately mismatched to the impedance of the communication for a predetermined frequency band. This mismatch is chosen to optimize the signal loss between the antenna and the communication circuit when the antenna is far and near a disturbing source. The imaginary part of the antenna impedance has a sign opposite to the sign of the circuit impedance when the antenna is a predetermined distance from the disturbing source.

6 Claims, 4 Drawing Sheets

PORTABLE COMMUNICATION DEVICE WITH OPTIMIZED TRANSMISSION LOSS

FIELD OF THE INVENTION

The present invention relates to a portable communication device comprising an antenna. Such portable communication devices are generally known. Examples of such portable communication devices are hand sets for mobile and cordless telephony and pagers.

BACKGROUND OF THE INVENTION

In prior art portable communication devices, the antenna and the portable communication device are matched for free space conditions. The matching between the portable communication device and the antenna deteriorates when a disturbing object, such as the human body, :s present near the antenna. This effect is known as the proximity effect. As a result of this effect, in the transmitting situation as well as in the receiving situation considerable signal losses may occur.

In European Patent 0 341 238, some ways to avoid the proximity effect are described. In column 2, lines 1–16, it is described that the antenna and the communication device are matched in the situation, that the antenna is "on" the body. This solution, has the drawback, that the performance in free space conditions is bad. Another solution described in EP 0 341 238 is to adaptively match the antenna and the communication device, in dependence on the situation. This solution has the drawback, that extra means are necessary, for measuring the quality of matching between the antenna and the communication device and changing the impedances of the communication device and/or antenna, when matching is bad. This makes that such a communication device complicated.

SUMMARY OF THE INVENTION

It is an object of the present invention to provide a portable communication device, which has an acceptable performance, when a disturbing object is near the antenna and also in free space conditions and which is not complicated.

Thereto a portable communication device according to the present invention is characterized in that, the communication device and the antenna are mismatched within a frequency band of interest, for equalizing a transmission loss between the antenna and the communication device as a function of a distance between a disturbing object and the antenna. The transmission loss between the antenna and the communication device is a measure for the performance of the communication device. As a result of the equalization of this transmission loss as a function of the distance between a disturbing object and the antenna, the portable communication device has an acceptable performance in the vicinity of such a disturbing object and in free space conditions. This means that, received signals and transmitted signals have to be amplified less than in the prior art devices. This means that in the portable communication device according to the invention, less power dissipation takes place than in prior art portable communication devices. This has as a result, that smaller batteries can be used or, if the same batteries are used, that their lives will be longer.

An embodiment of the portable communication device according to the present invention is characterized in that, the mismatch is arranged so as to lower the transmission loss between the antenna and the communication device in comparison with the transmission loss when the communication device and the antenna are matched, in the situation that the distance between the antenna and a disturbing object is small. The situation, that the distance between a disturbing object, as for example the human body or the human head, and the antenna is small, is a particularly important one for a portable communication device, since this is the situation in which it finds itself most of the time. When a user makes a call, the portable communication device finds itself near the head of the user. When the user carries the portable communication device with him, it finds itself near the user's body. The mismatch according to this embodiment leads to a slight deterioration of the transmission loss in the free space condition, in comparison with the prior art communication devices. However, the performance in the free space condition remains satisfactory. A satisfactory performance in free space conditions is necessary for the following reasons:

When the communication device is left on wooden table or near another object, which is not very disturbing, the communication device finds itself practically in free space conditions. When a call comes in, the performance of the communication device needs to be good enough to receive the call properly.

Perform type approval tests in anechoic chambers in free space conditions. If the free space performance were not acceptable, the communication device would not pass the type approval tests.

A further embodiment of the portable communication device according to the present invention is characterized in that, a ratio between an antenna impedance of the antenna and a device impedance of the portable communication fulfils the following conditions:

a first one of these impedances has a substantially real value for free space conditions, a second one of these impedances has a real part having a value in the range of 35%–70% of the value of the first impedance and an imaginary part in the range of 15%–30% of the value of the first impedance, within the frequency band of interest, the imaginary part of the second impedance having a sign opposite to the sign of the imaginary part of the first impedance when the antenna is $0.2\lambda$ from a disturbing object. When the ratio of the antenna impedance and the device impedance is made like this, a very good equalization of the transmission loss is obtained as a function of the distance between a disturbing object and the antenna.

BRIEF DESCRIPTION OF THE DRAWINGS

The invention will be further explained with reference to the drawings in which.

DETAILED DESCRIPTION OF THE INVENTION

Figure 1:
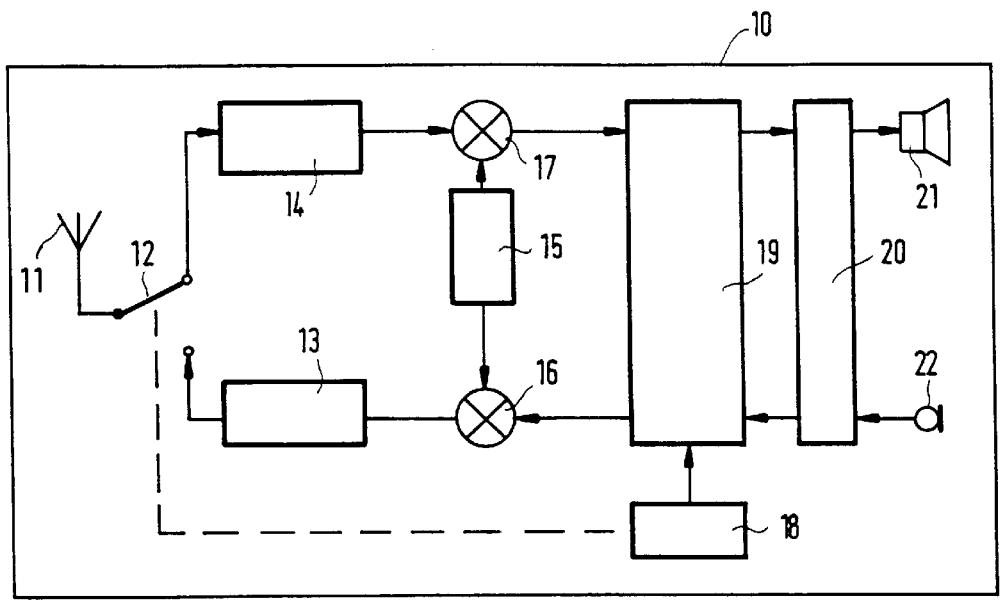
FIG. 1 shows a block diagram of a portable communication device.

FIG. 1 shows in a general way a block diagram of a portable communication device 10, such as for example a hand set for mobile or cordless telephony. The portable communication device comprises an antenna 11, an controlled switch 12, an RF-transmitting stage 13, an RF-receiving stage 14, a frequency synthesizer 15, a first and a second mixer 16,17, a controller 18, a baseband processing unit 19, a codec 20, a loudspeaker 21 and a microphone 22. Such portable communication devices are widely known. They work at frequencies in the range between several tens of MHz and a few GHz, depending on the system for which they are meant (GSM, DECT etc.). By switching the switch 12, the communication device transmits or receives signals. The first mixer 16 mixes a high frequency wave, generated by the frequency synthesizer 15 with a baseband signal in order to obtain an RF-signal to be transmitted via the RF-transmitting stage 13. The second mixer 17 mixes a high frequency wave with an RF-signal, received via the RF-receiving stage 14 in order to obtain a baseband signal. The controller 18 and the codec 19 are arranged for processing and coding of the analog signal coming in via the microphone 22 so as to obtain a baseband signal (digital) and decoding the baseband signal so as to obtain an analog signal, to be reproduced by the loudspeaker 21.

Figure 2:
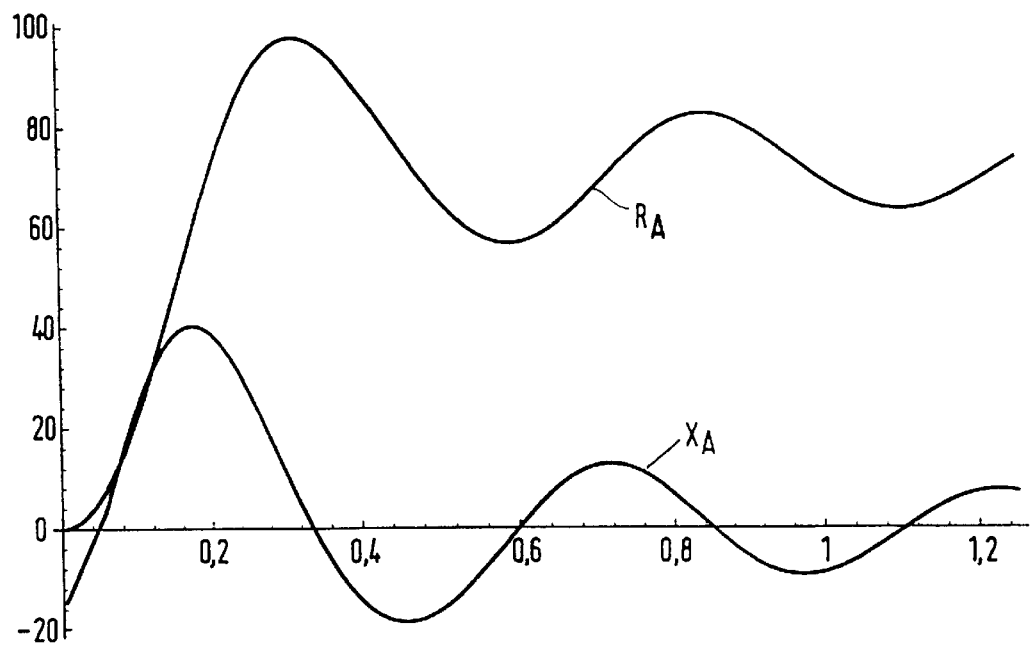
FIG. 2 shows the value of the antenna impedance of a dipole antenna as a function of the distance between the antenna and a disturbing object.

FIG. 2 shows the value of the antenna impedance of a dipole antenna as a function of the distance between the antenna and a disturbing object. The distance between the disturbing object and the antenna is expressed in wavelengths ($\lambda$) belonging to the frequency for which the dipole antenna has been designed. The real part of the antenna impedance is indicated by $R_A$ and the imaginary part by $X_A$. For large distances between the disturbing object and the antenna the antenna impedance has a real value $R_A$ of about 73 ohms and an imaginary value $X_A$ of approximately zero. When the distance between the disturbing object and the antenna is small, the antenna impedance has a quite different value. In prior art devices, where the antenna impedance and the impedance of the communication device are matched for free space conditions, this has as a result, that, when the distance between the disturbing object and the antenna is small, the transmission loss between the antenna and the communication device is high. This can clearly be seen in graph a in FIGS. 3,5 and 7. Because portable communication devices usually are worn near the body of the user and the fact that the user's body is a quite disturbing object, this situation is quite important in practice.

In the portable communication device according to the invention, a deliberate mismatch is arranged between the antenna impedance and the impedance of the communication device, which is in the transmitting situation the output impedance of the transmitting stage 13 and in the receiving situation the input impedance of the receiving stage 14. This deliberate mismatch equalizes the transmission loss between the antenna and the communication device as a function of the distance between the antenna and a disturbing object. The transmission loss TL is defined as follows:

$$TL = -10 \log T \quad (1)$$

in which $$T = 1 - \left| \frac{Z_C^* - Z_A}{Z_C + Z_A} \right|^2 \quad (3)$$

$$T = 1 - \left| \frac{Z_C - Z_A^*}{Z_C + Z_A} \right|^2$$

wherein $Z_C$=the impedance of the communication device, which is in the transmitting situation the output impedance of the RF-transmitting stage 13 and in the receiving situation, the input impedance of the RF-receiving stage 14, $Z_A^*$=the complex conjugated value of $Z_A$, and $Z_A$=the antenna impedance.

Figure 3:
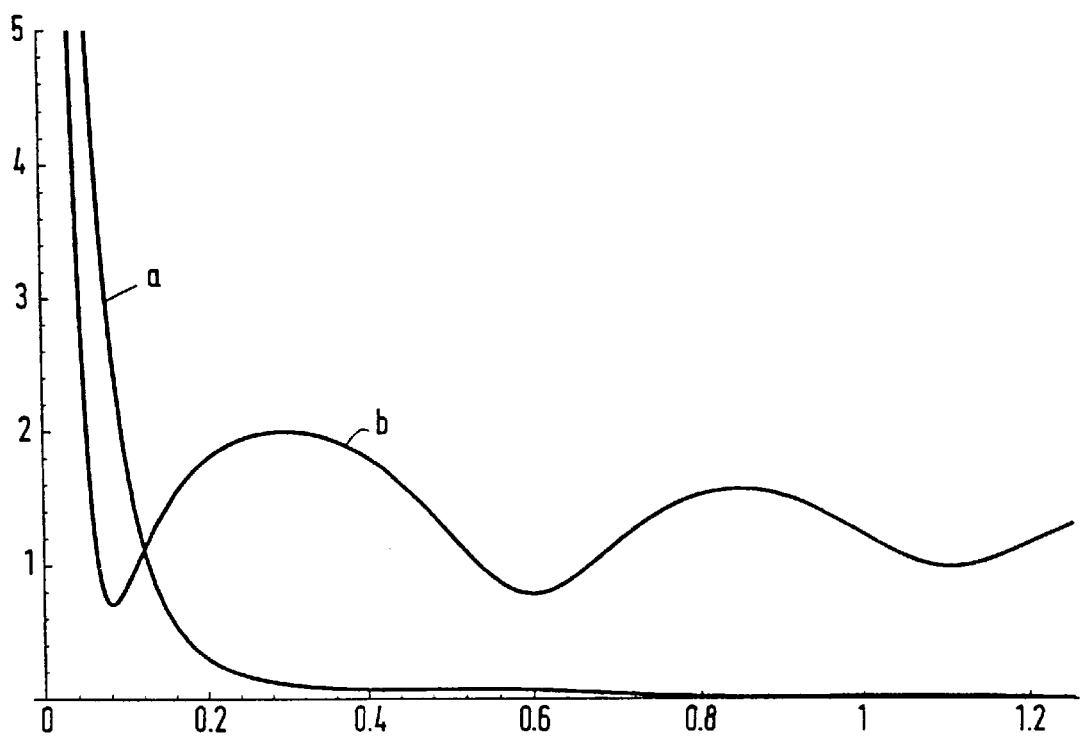
FIGS. 3, 5 and 7 show the value of the transmission loss between the antenna and the communication device as a function of the distance between the antenna and a disturbing object for three different embodiments of the communication device of the present invention compared with the value of the transmission loss as a function of the distance between the antenna and the disturbing object, in case that the antenna impedance and the impedance of the communication device are matched, as in prior art devices.
Figure 4:
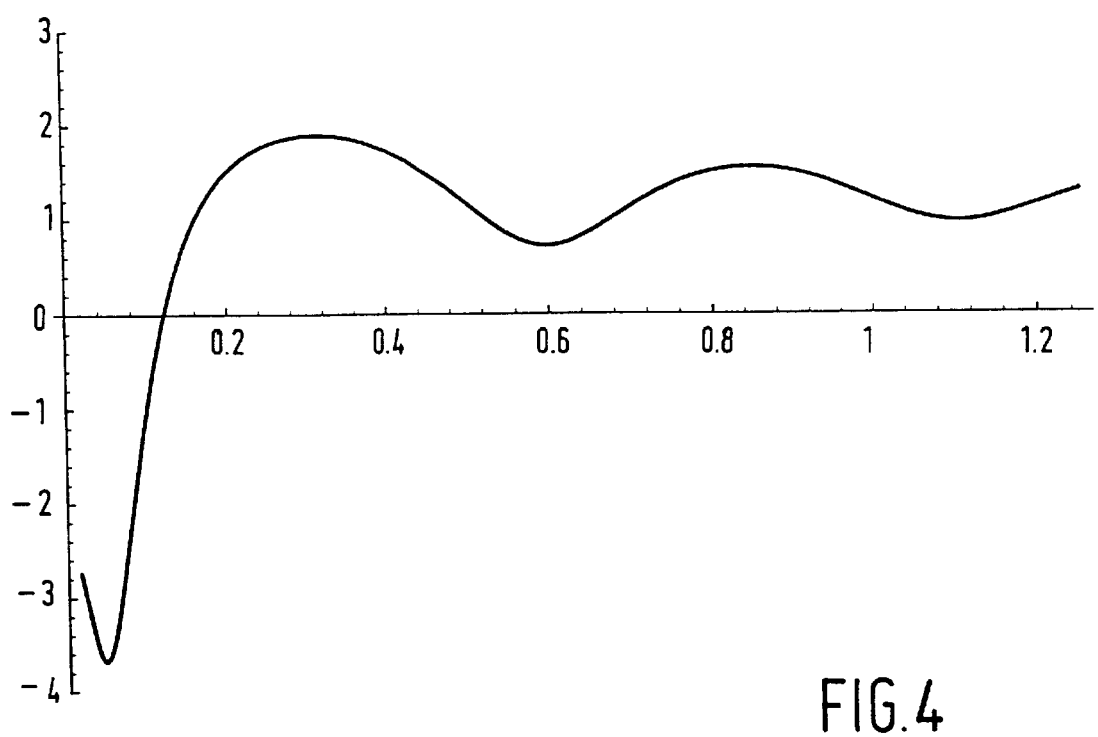
FIGS. 4, 6 and 8 show the difference in transmission loss between the communication device according to the invention and a prior art communication device, in which the antenna and the communication device are matched for free space conditions, for these three embodiments.

FIG. 3 shows the value of the transmission loss between the antenna and the communication device in decibels as a function of the distance between the antenna and a disturbing object, in wavelengths ($\lambda$) belonging to the frequency of interest. Curve a shows the transmission loss, in case that the antenna impedance and impedance of the communication device are matched for free space conditions. Curve b shows the transmission loss of a first embodiment of the communication device according to the present invention, in which the free space antenna impedance is 73 Ohms and the impedance of the communication device at the frequency of interest is 24–3i Ohms. FIG. 4 shows the difference in transmission loss between curve a and b for this embodiment. The following conclusions can be drawn from FIGS. 3 and 4. At distances smaller than 0.12$\lambda$, the transmission loss of the communication device according to the present invention is smaller than that of the prior art device. A wavelength at 900 MHZ, the frequency band of GSM, is approximately 33 cm, so at this frequency for distances smaller than 4 cm, the communication device according to the invention has a clearly better performance than the prior art communication device. The increased transmission loss at larger distances is only to such an extent that the communication device still has an acceptable performance in that situation, so that calls can be received properly and type approval tests will be passed. In the case according to FIG. 3, the impedance of the communication device is chosen to arrive at a maximum transmission loss $TL_{MAX}$ of 2 dB. As already explained, a portable communication device finds itself most of the time near a disturbing object, so the extra performance for small distances is very useful.

Figure 5:
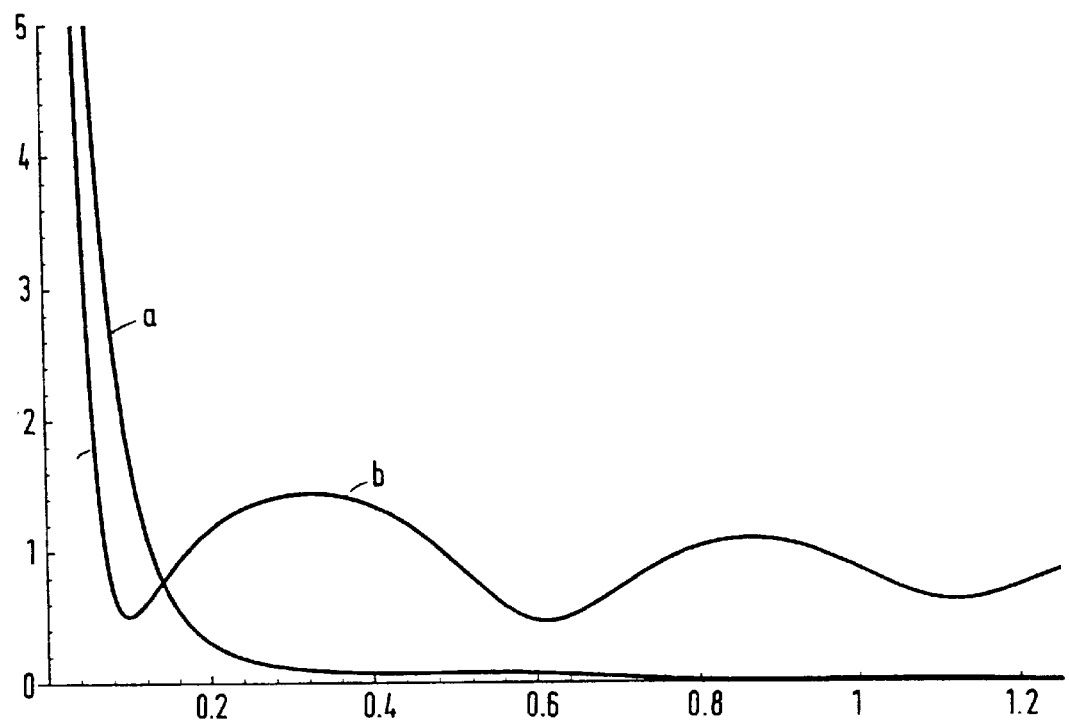
Figure 6:
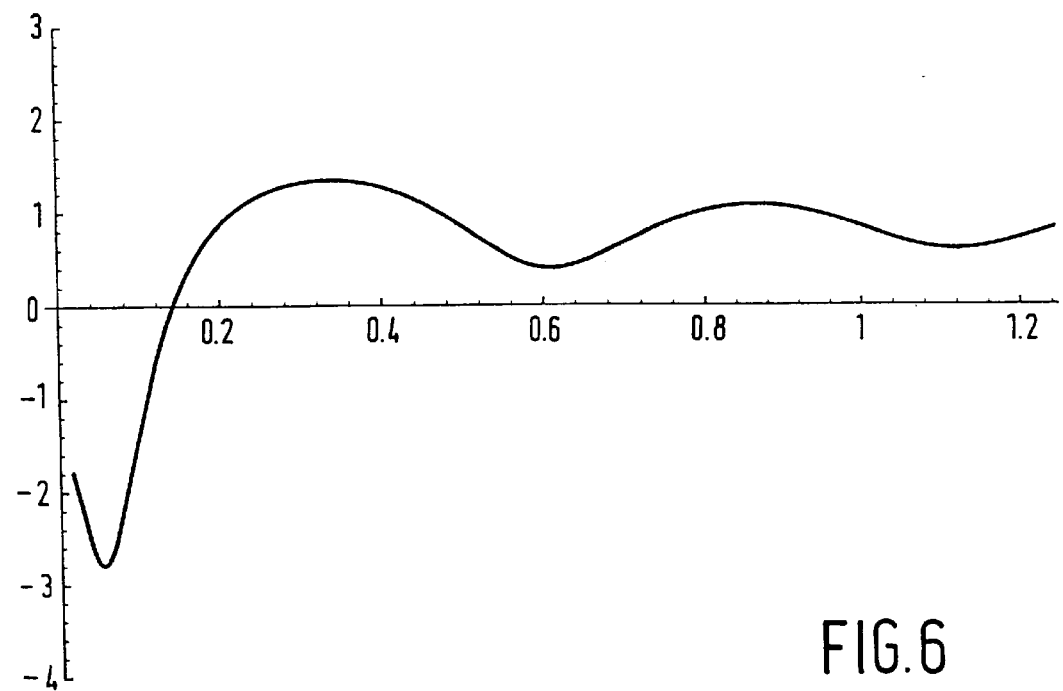

In FIG. 5 the transmission losses between the antenna and the communication device are shown for a prior art device in which the antenna impedance and the impedance of the communication device are matched for free space conditions (curve a) and for a second embodiment of the communication device according to the present invention, in which the antenna impedance has a value of 73 Ohms and the impedance of the communication device has a value of 30–8i Ohms (curve b). FIG. 6 shows the difference in transmission loss between curve a and b for this embodiment. At distances smaller than 0.147$\lambda$, the transmission loss of the communication device according to the present invention is smaller than that of the prior art device. However, the difference in transmission loss between this embodiment and the prior art device is smaller than for the first embodiment. In the case according to FIG. 3, the impedance of the communication device is chosen to arrive at a maximum transmission loss $TL_{MAX}$ of 1.5 dB. This results in less deterioration of the transmission loss for larger distances.

Figure 7:
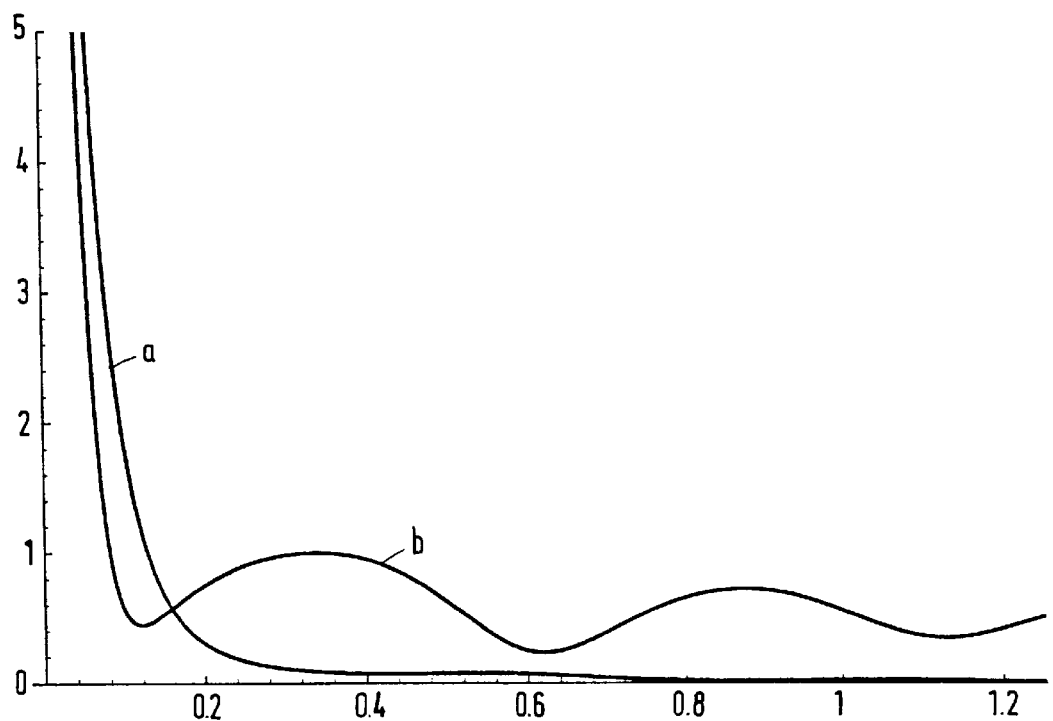
Figure 8:
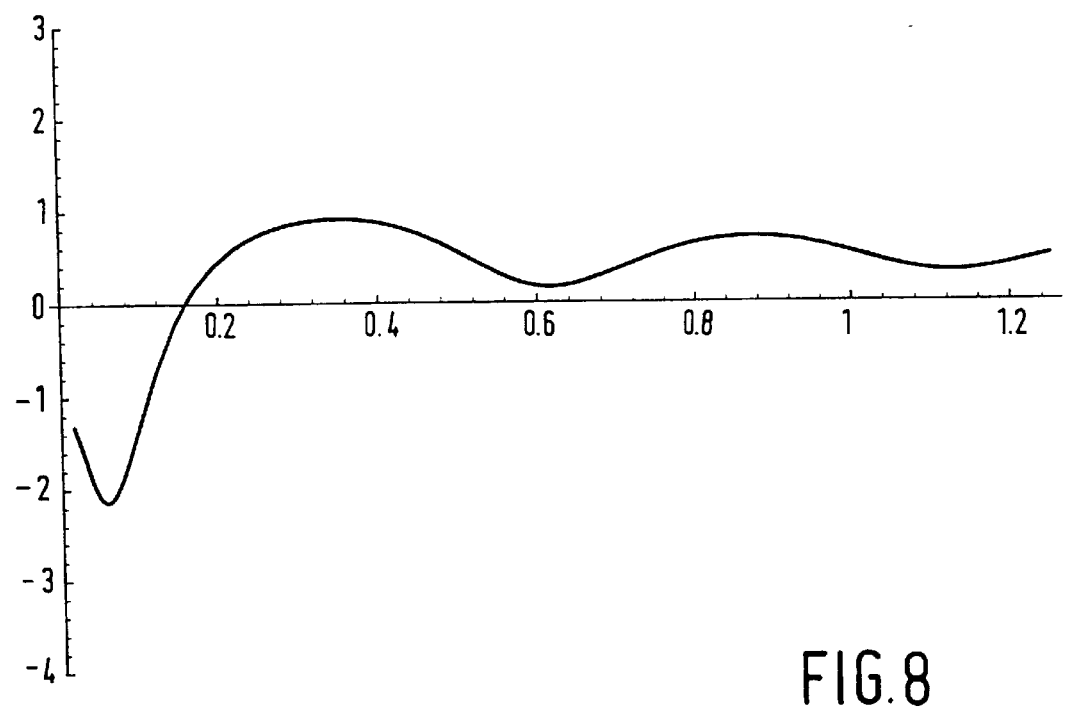

In FIG. 7 the transmission losses between the antenna and the communication device are shown for a prior art device in which the antenna impedance and the impedance of the communication device are matched for free space conditions (curve a) and for a third embodiment of the communication device according to the present invention, in which the antenna impedance has a value of 73 Ohms and the impedance of the communication device has a value of 37–10i Ohms (curve b). FIG. 8 shows the difference in transmission loss between curve a and b for this embodiment. For distances smaller than 0.20λ the communication device according to the present invention has a smaller transmission loss than the prior art communication device. The difference in transmission loss between this embodiment and the prior art device is even smaller than for the first and second embodiment. In the case according to FIG. 7, the impedance of the communication device is chosen to arrive at a maximum transmission loss $TL_{MAX}$ of 1 dB. However, the deterioration of the transmission loss for larger distances is smaller, too.

From FIGS. 3 to 8 follows that a smaller transmission loss at small distances results in a higher transmission loss at large distances. A trade off between them can be made.

It is also possible, in a communication device according to the present invention, to make the impedance of the communication device real and the impedance of the antenna complex, or to use other mismatching impedance combinations.

The present invention has been described with a dipole antenna. It is, however, also usable with antennas of different types, having different antenna impedances, like for example complex ones. In case that the antenna impedance is complex, also the impedance of the communication device may be made complex, if this leads to a good equalization of the transmission loss as a function of the distance between the antenna and a disturbing object.

I claim:

1. A portable communication device having a device impedance and comprising an antenna having an antenna impedance, wherein the antenna impedance has a predetermined value which is mismatched to the device impedance within a frequency band of interest, for equalizing a transmission loss between the antenna and the communication device as a function of a distance between a disturbing object and the antenna, wherein an imaginary part of said antenna impedance has a sign opposite to a sign of said device impedance when the antenna is a predetermined distance from said disturbing object.

2. The portable communication device as claimed in claim 1 wherein, when the distance between the antenna and the disturbing object is decreased, the mismatch is arranged so as to lower the transmission loss between the antenna and the communication device in comparison with the transmission loss when the communication device and the antenna are matched.

3. A portable communication device having a device impedance and comprising an antenna having an antenna impedance, wherein the antenna impedance has a predetermined value which is mismatched to the device impedance within a frequency band of interest, for equalizing a transmission loss between the antenna and the communication device as a function of a distance between a disturbing object and the antenna, wherein a ratio between the antenna impedance and the device impedance fulfils the following conditions:

a first one of these the device and antenna impedances has a substantially real value for free space conditions, and a second one of these the device and antenna impedances has a real part having a value in the range of 35%–70% of the value of the first impedance and an imaginary part in the range of 5%–30% of the value of the first impedance, within the frequency band of interest, the imaginary part having a sign opposite to the sign of the imaginary part of the first impedance when the antenna is 0.2λ from said disturbing object.

4. A portable electronic apparatus having an antenna and a communication circuit, wherein a predetermined antenna impedance of said antenna and a circuit impedance of said communication circuit are mismatched for a predetermined frequency band to optimize a signal loss between said antenna and said communication circuit when said antenna is far and near a disturbing source, an imaginary part of said antenna impedance having a sign opposite to a sign of said circuit impedance when the antenna is a predetermined distance from said disturbing source.

5. The portable electronic apparatus of claim 4 wherein the predetermined distance is 0.2λ, where λ is a wavelength of operation of said apparatus.

6. The portable electronic apparatus of claim 4 wherein the one of said antenna impedance and said circuit impedance has a substantially real value for free space conditions, and another of said antenna impedance and said circuit impedance has a real part having a value which is approximately 35%–70% of said one impedance and an imaginary part which is approximately 5%–30% of said one impedance.

* * * * *